United States Patent
Zurcher

[11] 3,800,607
[45] Apr. 2, 1974

[54] FRICTION RING DRIVE WITH INTERMEDIATE DISKS

[76] Inventor: Andre Zurcher, St. Jean, 3280 Merlach, Switzerland

[22] Filed: Feb. 4, 1972

[21] Appl. No.: 223,672

[30] Foreign Application Priority Data
Feb. 18, 1971 Switzerland.................. 2360/71

[52] U.S. Cl. .................................................. 74/200
[51] Int. Cl. ............................................ F16h 15/26
[58] Field of Search ............... 74/190, 200, 199, 208

[56] References Cited
FOREIGN PATENTS OR APPLICATIONS

| 847,239 | 8/1949 | Germany | 74/200 |
|---|---|---|---|
| 415,217 | 12/1966 | Switzerland | 74/200 |
| 421,647 | 4/1967 | Switzerland | 74/200 |

Primary Examiner—Benjamin W. Wyche
Assistant Examiner—Allan Russell Burke
Attorney, Agent, or Firm—Werner W. Kleeman

[57] ABSTRACT

A friction drive wherein two substantially coaxial wheel disks support a respective friction ring having substantially conical friction surfaces. One of the wheel disks is connected with a drive shaft and the other wheel disk with a power take-off shaft. A rim of similar transmission mechanisms is arranged substantially coaxially with respect to the friction rings. Each transmission mechanism comprises transmission means and guide means for said transmission means. Each transmission means possesses substantially spherical transmission surfaces maintained in frictional contact with an associated one of the friction surfaces of the friction rings. An adjustment mechanism serves for the common and uniform pivoting of all of the transmission mechanisms in axial planes of the wheel disks for the infinite regulation of the transmission ratio of the friction drive. The adjustment mechanism comprises a rotatable plate member provided with control slot means inclined at a substantially uniform angle to a radius and controlling the guide means of all the transmission mechanisms. The transmission means embodying two substantially spherical section-shaped friction heads having uninterrupted external surfaces defining the transmission surfaces and a respective shaft portion mounted at each friction head. The shaft portions are mounted in a bearing sleeve. A pair of disk members is fixedly mounted in the drive housing. One of these disk members supports all of the bearing sleeves and the other of the disk members guides such bearing sleeves during the adjustment in the axial planes. The rotatable plate member of the adjustment mechanism and the two fixedly mounted plate members are arranged at a spacing adjacent one another between the friction head situated at the one wheel disk and the friction head situated at the other wheel disk.

4 Claims, 3 Drawing Figures

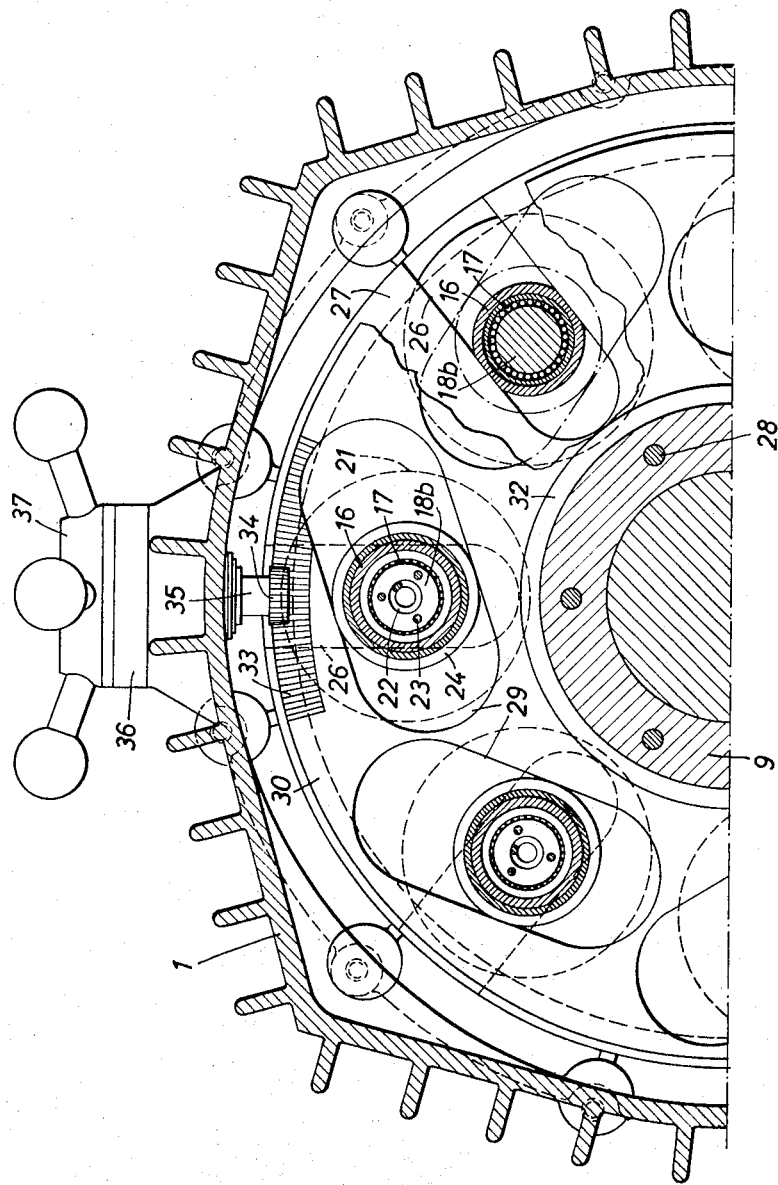

3,800,607

FRICTION RING DRIVE WITH INTERMEDIATE DISKS

BACKGROUND OF THE INVENTION

The present invention relates to a new and improved friction drive of the type incorporating two coaxial wheel disks each carrying a friction ring with conical friction surfaces, one of the wheel disks being connected with a drive shaft and the other with a power take-off shaft. There is also provided a crown or rim of similar transmission mechanisms, which rim of transmission mechanisms is arranged coaxially with regard to the friction rings, and such transmission mechanisms, apart from possessing respective transmission means, also have guide means for such transmission means. The transmission means possess substantially spherical transmission surfaces which are maintained in frictional contact with the one or the other of both friction ring-friction surfaces. An adjustment mechanism serves for the common and uniform pivoting of all of the transmission mechanisms in axial planes of the wheel disks for the infinite regulation or change of the transmission ratio of the drive. This adjustment mechanism embodies a rotating plate which is rotatably mounted in the drive or transmission housing for rotation about the axis of the wheel disks, and wherein the rotatable plate possesses control slots for controlling the guide means of all the transmission mechanisms, these control slots being inclined at a uniform angle with respect to a radius.

Now, in accordance with a friction drive of this general character which has proved itself quite well in practice and has been widely accepted, and which is known in the art under the designation "Kopp-drive", the transmission means of each transmission mechanism consists of a sphere or ball. All of the spheres or balls are supported at the inner surface of an idling entrained support- and lubricating ring. The guide means for each transmission mechanism essentially consists of a guide shaft which centrally pierces the ball, and the protruding end of such guide shaft travels in guide grooves of housing portions during the adjustment. One of these ends travels in an associated spiral adjustment slot of an adjustment disk or plate which is rotatably mounted in the housing coxially with respect to the friction wheels. Owing to a series of characteristics, this friction wheel drive advantageously distinguishes itself from many other friction wheel drives and different types of friction wheel drives. Among other things, one of the advantageous characteristics is that transmission of the rotational moment takes place by a multiplicity of friction balls arranged in a rim or crown. However, in certain instances of use, it has been found disadvantageous that the transmission ratio can only be varied within a rather narrow range. Hence, commercial versions of such friction wheel drives placed upon the market only permit variation of such transmission ratio, for instance, between 1 : 3 and 3 : 1. By virtue of the protruding guide shaft ends it is impossible to carry out an adjustment in those regions where the one or the other of the throughpassage or penetration points of the geometric axis of the balls and the associated guide shaft through the ball surface come into contact with the friction surface of the neighboring driven friction wheel. A further disadvantage which should be mentioned resides in the fact that such drive cannot be adjusted while at standstill, since the above-mentioned support- and lubricating ring binds or wedges with the ball surfaces in the absence of any rotational movement.

Certain other types of friction drives possess a greater adjustment range, however, are associated with other notable drawbacks. Belonging to this group of different type of friction wheel drives, there should be mentioned, for instance, the one disclosed in German Pat. 847,239. With this construction of friction drive, one wheel possesses a bowl-shaped configuration and is fixedly mounted, whereas the other wheel possesses the form of a mushroom and is movably arranged and can be brought by an adjustment mechanism into such a position that the largest diameter of the one wheel rolls upon the smallest diameter of the other wheel and vice versa. A very noteworthy drawback with this constructional form of friction wheel drive is the shape of both friction surfaces, the machining of which is quite expensive. A further disadvantage can be seen in that there is not used any automatic locking means which accommodates the contact pressure to the momentary load. Hence, there must be put up with a great deal of slip and wear during overload and impacts. With partial load, there must be effective the full frictional pressure just as for full load.

SUMMARY OF THE INVENTION

Hence, from what has been stated above, it will be apparent that this technology is still in need of a friction drive which is not associated with the aforementioned drawbacks and limitations of the state-of-the-art constructions. Therefore a primary objective of this invention is to provide a new and improved construction of friction drive which is not associated with the aforementioned drawbacks and limitations of the prior art constructions and effectively and reliably fulfills the existing need in the art.

Still a further and more specific but equally important object of this invention relates to a new and improved construction of friction wheel drive of the previously mentioned type -- wherein there is among other things also present a rim of transmission mechanisms -- but which is constructed additionally such that the regulation range and the transmittable load are considerably increased and that the regulability or adjustability is possible in the standstill condition, and further wherein for the purpose of bringing about an infinite change in the transmission ratio during continuously rotating driving friction ring, the driven friction ring can be brought out of the forward travel through the standstill to rearward travel.

Yet a further significant object of the present invention relates to a new and improved construction of friction drive which is relatively simple in design, economical to manufacture, extremely reliable in operation, and allows for an infinite regulation of the transmission ratio in a relatively simple and efficient manner.

Now in order to implement these and still further objects of the invention, which will become more readily apparent as the description proceeds, the inventive friction drive contemplates that the transmission means of each transmission mechanism, apart from containing the two spherical section-shaped friction heads, the uninterrupted outer surfaces of which serve as transmission surfaces, contains two shaft portions arranged or mounted at the friction heads. These shaft portions are mounted on the guide means possessing a bearing sleeve. Furthermore, the rotary plate of the adjustment mechanism and two disks which are stationary in the housing, one of which carries all of the bearing sleeves and the other of which guides such bearing sleeves in the axial planes during the adjustment, are arranged at a spacing adjacent to one another between the friction heads disposed at the one wheel disk and the friction head disposed at the other wheel disk.

There are also known to the art friction wheel drives, such as for instance taught in Swiss Pat. Nos. 415,217 and 421,647, wherein there are present two transmission mechanisms which are disposed in diametrically opposed relationship with respect to the common geometric axis of both friction wheels. These transmission mechanisms possess a semi-spherical friction head serving as the transmission element and bearing against both friction wheels. The arrangement is such that the axis of rotation of each friction head in the central position of the adjustment range is disposed perpendicular to the common geometric axis of both friction wheels. Consequently, there appear unfavorable friction conditions and pronounced wear.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 3 is a sectional view taken along the line III—III of FIG. 1, and depicts a plurality of the transmission mechanisms of this invention and a control plate having inclined control slots formed therein whereupon the transmission mechanisms are constrained to move in predetermined planes.

DETAILED DESCRIPTION OF THE PREFERRED EMBODIMENTS

Figure 1:
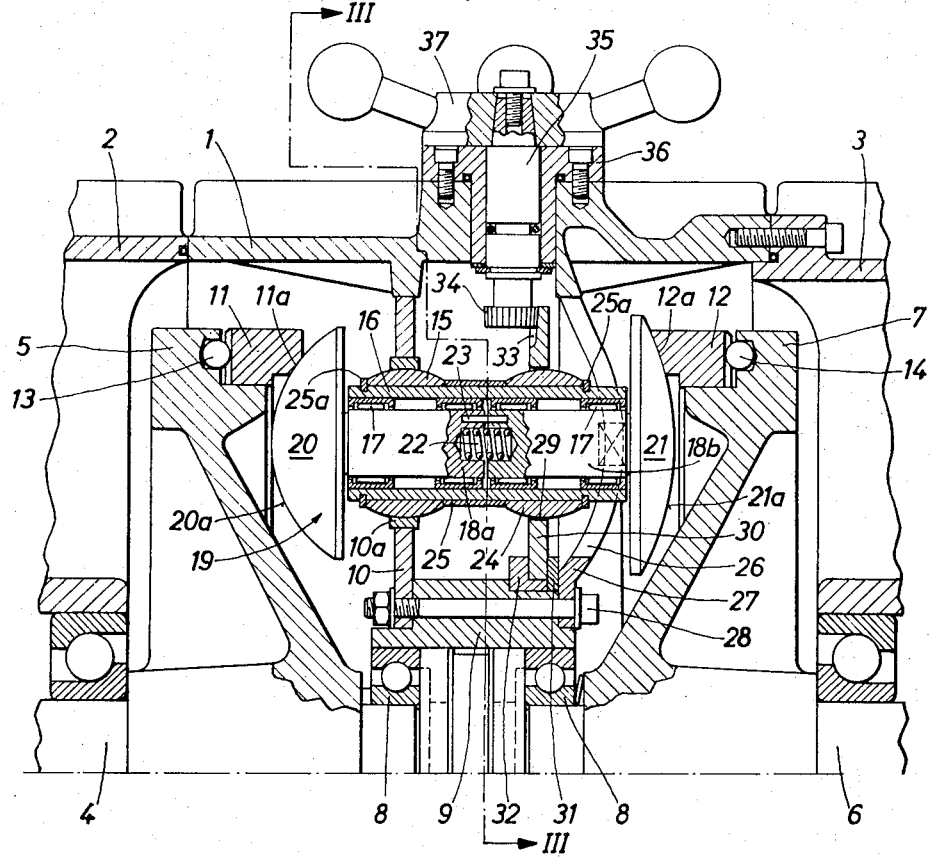
FIG. 1 is a fragmentary longitudinal sectional view of a friction drive wherein only one of the transmission mechanisms has been shown and specifically in a position in which the transmission ratio is 1 : 1.

Describing now the drawing, with the illustrated embodiment, there is provided for the friction drive or friction wheel drive a housing consisting of the intermediate or central portion 1 and the side portions 2 and 3. Within this housing 1-3 there is rotatably and nondisplaceably mounted a driving shaft member 4 formed of one-piece or integrally with the wheel disk 5 and also there is mounted in such housing a rotatable and nondisplaceable driven shaft member 6 formed of one-piece with the wheel disk 7. The neighboring shaft end portions also rotate in ball bearings 8 which are seated in a bearing body 9 which is fixedly retained by means of a circular ring disk 10 at the housing central portion 1. Each of both wheel disks 5 and 7 carries a friction ring 11 and 12 respectively which is loosely rotatably mounted thereon, whereby however a drive locking mechanism of known construction, for instance of the type shown in German Pat. No. 848,887 is associated therewith. Each such drive locking or blocking mechanism possesses a multiplicity of balls 13 and 14 respectively which bear against the flanks of recesses in the circumferential direction, these recesses being in the form of the legs of a wide-open V having such flanks which are inclined with respect to one another, and such recesses being provided at the confronting end faces of the associated friction ring and wheel disk.

Continuing, the friction drive is provided with a rim of similar transmission mechanisms which are arranged substantially coaxially to the friction rings 11 and 12. In the drawing, only one such transmission mechanism has been illustrated and has been designated in its entirety by reference character 19 in order to preserve clarity in illustration. One such transmission mechanism 19 will be described more fully hereinafter. The friction drive furthermore possesses an adjustment mechanism for the common and uniform pivoting or rocking of all of the transmission mechanisms 19 in axial planes of the wheel disks 5 and 7 for the infinite regulation of such friction drive.

Now a circular hole, which has not been particularly referenced, is provided for each transmission mechanism in the circular ring disk 10 and within which there is fixedly seated a bearing ring 10a. A barrel-shaped annular or ring body 15 is retained in such bearing ring 10a. Within a bearing sleeve 16 inserted into the annular body 15 there are mounted by means of needle bearings 17 the shaft portions 18a and 18b, which are formed or otherwise provided at a respective spherical section-shaped friction head 20 and 21 respectively, and the uninterrupted outer surfaces of which are retained in frictional contact with the one or other of both substantially conical friction ring surfaces 11a and 12a respectively. As long as the drive locking mechanism is not effective, and to which belong the balls 13 and 14 respectively, i.e. during standstill and when the drive is not driven under load, the contact pressure only results from the pressure of the spring means 22 inserted between the confronting ends of the shaft portions 18a and 18b. The drive connection between these shaft portions 18a and 18b is insured for by the axially parallel pins 23 inserted into the just-mentioned shaft ends.

As illustrated, it is possible for the friction head outer surfaces 20a and 21a to possess different size radii r and R respectively, wherein the common center Z of such outer surfaces coincides with the pivot center of the ring body 15 at the bearing ring 10a. According to a variant constructional form the radii r and R could be of the same magnitude, whereby then the pivot center Z would then be disposed at the longitudinal center of the drive where also there would be arranged the circular ring disk 10.

Apart from the drum- or barrel-shaped ring or annular body 15 there is fixedly retained upon the bearing sleeve 16 a similar ring or annular body 24 with the intermediately arranged spacer ring 25. The three components 15, 24 and 25 are fixedly retained in axial direction between two spring rings 25a which engage in peripheral or circumferential grooves of the bearing sleeve 16. The end of the bearing sleeve 16 located at the friction head 21 displaceably engages, and while secured against rotation, with an associated guide slot 26, the center line of which is contained in an axial plane of the shafts 4 and 6. A plurality of such guide slots or grooves 26, one for each transmission mechanism 19, is provided at a disk or plate 27 which together with the bearing body 9 is secured by means of threaded bolts 28 at the circular ring disk 10.

The ring body 24 of each transmission mechanism 19 engages with an associated control slot 29, provided at a rotatable plate 30 belonging to the adjustment mechanism, and extending at an inclination to a plane containing the axes of the shafts 4 and 5 of the shaft portions 18a and 18b of such transmission mechanism and extending at an inclined angle. It should be understood that this course or extension is the same for all of the control slots 29, so that rotation of the rotatable plate 30 produces a uniform pivoting or rocking of all of the transmission mechanisms 19. The rotatable plate 30 is rotatably and axially non-displaceably mounted upon the bearing body 9 by means of ring elements 31 and 32. This rotatable plate 30 is provided at its outer edge, at a portion of its one side surface or face, with a cone or bevel tooth arrangement 33 which is in meshing engagement with the bevel teeth of a bevel pinion 34. This pinion 34 is formed at the inner end of an adjustment shaft 35 which is mounted in a bearing fixture or attachment 36 secured to the housing and at its outermost end is provided with a manual adjustment wheel 37.

From the above considerations it should be apparent that at each transmission mechanism 19 both of the friction heads 20 and 21 together with the associated shaft portions 18a and 18b and the pins 23 form the "transmission means," whereas the components 16 and 17 form the "guide means" therefor. The uninterrupted spherical outer surfaces 20a and 21a of the friction heads 20 and 21 respectively function as transmission surfaces which are in frictional contact with the conical ring surfaces 11a and 12a respectively of the one or the other friction ring 11 and 12 respectively.

Owing to the arrangement of the "guide means" as well as also the rotatable plate 30 and the circular ring disk 10 carrying all of the transmission mechanisms 19 and arranged between the friction heads 20 and 21 there is afforded — together with the construction of the friction heads 20 and 21 as spherical sections or segmented spheres with uninterrupted external surfaces — among other things the initially mentioned enlargement or improvement of the adjustment range and specifically at a drive having a multiplicity of transmission mechanisms which collectively undertake the transmission of the rotational moment. Otherwise, the mode of operation is similar to the heretofore mentioned "Kopp-drive," with the exception of the revolving support ring associated therewith.

When the transmission mechanisms 19 are adjusted by the adjustment means or mechanism 26, 30, 35 and 37 in such a manner that for each such transmission mechanism its own axis extends parallel to the common axis of rotation of the shafts 4 and 6, then as shown in FIG. 1, the difference in the size of the radii r and R has no effect and the transmission ratio of the drive is then 1 : 1. As soon as, however, the inherent axis of each transmission mechanism 19 is inclined at a certain angle with respect to the common axis of the shafts 4 and 6 then there is a different transmission ratio.

Figure 2:
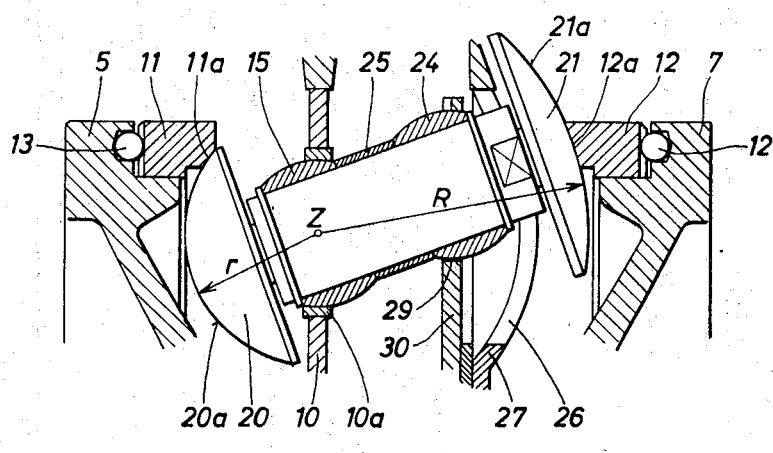
FIG. 2 is a sectional view of the friction drive depicted in FIG. 1, wherein there is shown in front view a bearing sleeve and wherein the transmission mechanism assumes a position in which the driven friction ring remains stationary.

In both situations the fact that the transmission mechanisms can be brought into contact with the apex of their friction head 21 at the friction surface 12a of the friction ring 12, such as has been shown in FIG. 2, has the effect that then the driven components 12, 7 remain stationary. In both situations a construction could be realized in which the transmission mechanisms 19 could be inclined out of the position of FIG. 1 past the position of FIG. 2 with the result that then the driven components 12 and 7 would rotate in the reverse rotational direction. Of course, the transmission mechanisms 19 could also be inclined out of the position of FIG. 1 in the other sense, approximately until reaching a position in which the friction head 21 bears by means of the outer edge of its transmission surface 21a at the friction ring 12, whereby then the driven portions 12 and 7 are rapidly driven in the forward direction of rotation with the largest possible transmission ratio.

It is still further to be mentioned that the cones containing the friction surfaces 11a and 12a can be widened towards the center of the drive or transmission and thus produce favorable conditions between such friction surfaces and those of the friction heads 20 and 21, especially as concerns reduction in wear, because with given load and contact force there results a smaller surface compression.

It is also worthy of mention that the friction heads are situated relatively far from one another so that also the friction wheels can be maintained at such a spacing that it is possible to also mount the neighboring ends of the shafts 4 and 6 in the component 9 which, as explained above, is connected by the disks 10 and 27 rigidly with the drive housing.

While there is shown and described present preferred embodiments of the invention, it is to be distinctly understood that the invention is not limited thereto but may be otherwise variously embodied and practiced within the scope of the following claims. Accordingly,

What is claimed is:

1. A friction drive comprising a drive housing, two substantially coaxial wheel disks, a respective friction ring having substantially conical friction surfaces supported by each wheel disk, a drive shaft and a power take-off shaft, one of said wheel disks being connected with said drive shaft and the other wheel disk with the power take-off shaft, a plurality of similar transmission mechanisms arranged substantially coaxially with respect to said friction rings, each of said transmission mechanisms comprising transmission means and guide means for said transmission means, said transmission means possessing substantially spherical transmission surfaces maintained in frictional contact with an associated one of said friction surfaces of said friction rings, an adjustment mechanism for the common and uniform pivoting of all of said transmission mechanisms in axial planes of the wheel disks for the infinite regulation of the transmission ratio of the friction drive, said adjustment mechanism comprising a rotatable plate member rotatably mounted in said drive housing for rotation about the axis of said wheel disks, said rotatable plate member being provided with control slot means inclined at a substantially uniform angle to a radial line extending from said axis and controlling the guide means of all said transmission mechanisms, said transmission means of each transmission mechanism embodying two substantially spherical section-shaped friction heads having uninterrupted external surfaces defining said transmission surfaces and a respective shaft portion mounted at each friction head, each said guide means embodying a bearing sleeve, said shaft portions being mounted in said bearing sleeve, a pair of disk members fixedly mounted in said drive housing, one of said disk members supporting all of the bearing sleeves and the other of said disk members guiding such bearing sleeves during adjustment in said axial planes, and wherein said rotatable plate member of the adjustment mechanism and said two fixedly mounted disk members are arranged at a spacing adjacent one another between said friction head situated at the one wheel disk and the friction head situated at the other wheel disk.

2. The friction drive as defined in claim 1, wherein the cone defining the conical friction surfaces widens in the direction of the center of the friction drive.

3. The friction drive as defined in claim 2, further including two substantially barrel-shaped bodies fixedly retained at each bearing sleeve, a spacer ring disposed between said barrel-shaped bodies, one of said barrel-shaped bodies serving for the pivotal mounting of the bearing sleeve at said one disk member supporting said bearing sleeves and the other barrel-shaped body engaging with the associated control slot means of the rotatable plate member.

4. The friction drive as defined in claim 1, wherein the spherical section-shaped outer surfaces of both friction heads of each transmission mechanism possess different size radius.

* * * * *